US012763518B2

United States Patent

(12) United States Patent
Singh et al.

(10) Patent No.: US 12,763,518 B2
(45) Date of Patent: Oct. 13, 2026

(54) CONNECTOR, CONNECTION ASSEMBLY AND CONNECTION GROUP

(71) Applicants: TE Connectivity India Private Limited, Bangalore (IN); Tyco Electronics (Shanghai) Co., Ltd., Shanghai (CN)

(72) Inventors: Siddharth Singh, Bangalore (IN); Yunhe Wang, Shanghai (CN); Songhua Liu, Dongguan (CN); Wenke He, Shanghai (CN)

(73) Assignees: TE Connectivity India Private Limited, Bangalore (IN); Tyco Electronics (Shanghai) Co., Ltd., Shanghai (CN)

( * ) Notice: Subject to any disclaimer, the term of this patent is extended or adjusted under 35 U.S.C. 154(b) by 222 days.

(21) Appl. No.: 18/481,458

(22) Filed: Oct. 5, 2023

(65) Prior Publication Data

US 2024/0120684 A1 Apr. 11, 2024

(51) Int. Cl.
*H01R 13/62* (2006.01)
*H01R 12/75* (2011.01)
(Continued)

(52) U.S. Cl.
CPC ......... *H01R 13/6275* (2013.01); *H01R 12/75* (2013.01); *H01R 13/58* (2013.01)

(58) Field of Classification Search
CPC .... H01R 13/6275; H01R 12/75; H01R 13/58; H01R 13/5804; H01R 13/635;
(Continued)

(56) References Cited

U.S. PATENT DOCUMENTS

| | | | |
|---|---|---|---|
| 4,863,400 | A | 9/1989 | Sato |
| 6,457,987 | B1 | 10/2002 | Yeh |

(Continued)

FOREIGN PATENT DOCUMENTS

| | | | |
|---|---|---|---|
| DE | 102007012365 | B3 | 7/2008 |
| JP | H0548251 | U | 6/1993 |
| SE | 1950342 | A1 | 4/2019 |

OTHER PUBLICATIONS

Office Action for corresponding KR Application No. 10-2023-0132560 dated Nov. 12, 2021 (7 pages).

(Continued)

*Primary Examiner* — Phuong K Dinh
(74) *Attorney, Agent, or Firm* — Jay J. Hoette; Carroll, Hoette & Butscher, LLC

(57) ABSTRACT

A connector for connecting at a proximal end of the connector along a connection direction includes a contact section adapted to fix at least one contact element, a base section, and an arm extending from the base section substantially along the connection direction, wherein the arm includes at least one securing element for securing the connector against the connection direction, and wherein the base section is located closer to a distal end of the connector than the contact section, the distal end being opposite to the proximal end along the connection direction. A connection assembly includes the connector and a mating connector. A connection group includes the connection assembly and a bulkhead that receives the connection assembly.

19 Claims, 8 Drawing Sheets

(51) Int. Cl.
*H01R 13/58* (2006.01)
*H01R 13/627* (2006.01)

(58) Field of Classification Search
CPC .. H01R 13/748; H01R 13/633; H01R 13/639; H01R 4/28; H01R 13/629
See application file for complete search history.

(56) References Cited

U.S. PATENT DOCUMENTS

| | | | | |
|---|---|---|---|---|
| 6,619,989 | B1 | 9/2003 | Yi | |
| 6,655,979 | B1 | 12/2003 | Lee | |
| 7,195,514 | B2 | 3/2007 | Wakefield et al. | |
| 10,120,138 | B2 * | 11/2018 | Jones | H01R 13/6275 |
| 10,658,796 | B2 | 5/2020 | Luttermann | |
| 2007/0141886 | A1 | 6/2007 | Hammer et al. | |
| 2015/0083455 | A1 | 3/2015 | Keith et al. | |
| 2017/0155210 | A1 | 6/2017 | Ludwig | |

OTHER PUBLICATIONS

Extended European Search Report for corresponding EP Application No. 23201585.9 dated Feb. 14, 2024 (9 pages).
Office Action for corresponding JP Application No. 2023172467 dated May 9, 2025 (9 pages).

* cited by examiner

CONNECTOR, CONNECTION ASSEMBLY AND CONNECTION GROUP

CROSS REFERENCE TO RELATED APPLICATIONS

This application claims the benefit of IN Application No. 202241057415, filed 7 Oct. 2022, the subject matter of which is herein incorporated by reference in its entirety.

BACKGROUND OF THE INVENTION

The subject matter herein relates to connectors, connection assemblies and connection groups.

Electrical connectors are used to electrically connect components of an electrical system. Connectors typically include a plug connector and a receptacle connector configured to be mated together. The connectors are typically secured together using latches. However, access to the latches, such as for unlatching, may be limited in some applications.

A need remains for a reliable and effective securing system for an electrical connector.

BRIEF DESCRIPTION OF THE INVENTION

The subject matter herein relates to a connector for connecting at a proximal end of the connector along a connection direction is provided. The connector includes a contact section adapted to fix at least one contact element, a base section, and an arm extending from the base section substantially along the connection direction, wherein the arm comprises at least one securing element for securing the connector against the connection direction.

The subject matter herein further relates to a connection assembly comprising the connector and a mating connector, as well as a connection group comprising the connector, the mating connector and a bulkhead.

The securing element can serve to secure the connector at a mating structure, for example at the mating connector. In particular when the connector is located within a further structure, for example a receptacle of a bulkhead, it can be difficult to release the securing element.

The subject matter herein provides a connector with which the securing element can be released more easily.

In an embodiment, this is achieved when the base section is located closer to a distal end of the connector than the contact section, the distal end being opposite to the proximal end along the connection direction. The base section and the arm are then more easily accessible, for example for a tool or a finger.

Solutions can further be improved by the following further developments and advantageous embodiments, which are independent of each other and can be combined arbitrarily, as desired.

The connector can be adapted for connecting to a mating connector. It can in particular be at least partially complementary to the mating connector. For example, in the case of a plug connector, a plug face can match a mating plug face of the mating connector.

The contact element can be adapted for contacting a mating contact element of the mating connector. The contact element can comprise a pin that can be inserted into a socket of the mating contact element or vice versa.

The connector can comprise more than one contact element.

The connector can be an electrical connector allowing the transmission of electrical signals and/or electrical power. However, other connectors are also possible. For example, the connector can be an optical connector allowing the transmission of an optical signal. In another example, the connector can be adapted for transmitting a fluid.

The securing element can be adapted for securing the connector relative to the mating connector against the connection direction. The securing element can thus be used for transmitting a strain or force acting upon the connector against the connection direction, and thus trying to separate the connector from the mating connector, onto the mating connector, in particular a corresponding structure on the mating connector.

At the base section, apart from tolerances, no or very little movement of the arm relative to a rest of the connector in the connection direction should be possible. Advantageously, no movement of the arm counter to the connection direction is possible at the base section. The base section can further serve to limit the movability of the fixed end of the arm in further directions, for example in and/or counter to one or more radial directions, each radial direction being perpendicular to the connection direction, or in and/or counter to at least one tangential direction, the tangential direction being perpendicular to the radial direction and perpendicular to the connection direction.

The securing by the securing element can be achieved by different mechanisms. For example, the securing element can create a form fit (also known as a positive fit), in which a movement of the first element is blocked by a second element that is in the way of the first element. In particular, the first element and/or the second element can comprise stop faces that are perpendicular to the desired movement, in the present case perpendicular to the connection direction.

In a further embodiment, the securing element can secure the connector by a force fit, in which a force acting between two elements is big enough to create a friction force that blocks a movement of the two elements relative to each other.

The securing element can lock the connector to the mating connector against the connection direction.

The securing element can be adapted such that a securing can be achieved automatically during a connection step, for example when the connector is moved relative to the mating connector. In another embodiment, the securing is nonautomatic and can, for example, be achieved by a manual action.

The securing element can be adapted to mate with a counter securing element at the mating connector. At least a part of the securing element can be complementary to a part of the mating securing element.

In an advantageous embodiment, the arm can comprise an actuation section, wherein the securing element is transferable from a securing state to a release state by an actuation at the actuation section. The securing element can be configured such that it is automatically brought into the securing state, possibly via the release state, when the connector is connected to the mating connector along the connection direction. No such automatic transfer should be possible when a force tries to separate the connector from the mating connector against the connection direction.

The securing element and/or the counter securing element on the mating connector can comprise at least one deflection surface inclined relative to the connection direction for automatically deflecting the arm during a connection step. An inclination angle can be less than 60° to achieve an easy deflection.

The transfer can achieved by a movement of the securing element, in particular a deflection of a part of the arm. In order to achieve the transfer, the actuation section can be pressed or pushed. In order to multiply or reduce the movement of the securing element, a lever effect can be used.

The securing element can be in a securing position in the securing state. Further, the securing element can be in a release position in the release state. The positions can in particular be defined as relative to other parts of the connector.

In a solution that allows an easy actuation, the actuation section can extend over more than 60% of the length of the contact section. The corresponding length of the actuation section can be more than 60% of the length of the contact section. Preferably, the actuation section extends over more than 80%, especially over more than 90% of the length of the contact section. The length of the contact section can be the length of the longest contact element. For each case the lengths can be measured along the connection direction.

To allow an easy actuation, the actuation section can be spaced along its entire length from the rest of the connector. The expression “spaced” should in particular mean that an open gap exists, in particular in a radial direction.

A particularly simple operation can be achieved when the securing element comprises a latching element or is a latching element. The corresponding counter securing element can be a counter latching element. Preferably, the counter latching element is a ring, a hole, especially a through-hole, or a receptacle, or comprises a ring, a hole or a receptacle. The counter latching element can be located entirely behind a front plane of the mating connector. It can be spaced behind the front plane. The front plane can be defined by the part of the connector that extends the furthest towards the connector against the connection direction.

The latching element can comprise a latching protrusion protruding radially outwards. By this, the latching element can be moved radially inwards which allows a simple and space saving operation.

A latching section of the arm comprising the latching element can be deflectable radially inwards.

The connector can be adapted for an inwards deflection of the latching section of the arm.

The arm can at least in sections be radially spaced from the rest of the connector at a distance, allowing a deflection length of the latching element between 1 and 5 times a latching height. The latching height can, for example, be the height of the latching element or a step, the heights being measured in the radial direction. A preferred ratio is 1 to 3, more preferably 1 to 2. This allows a compact design. The latching height can in particular be the height that can be achieved without breaking and/or with a predefined force. The predefined force can be set by an official or a company standard.

In particular, the latching section can be spaced between 1 and 5, preferably 1 to 3, preferably 1 to 2 times the latching height from the rest of the connector.

To allow a compact design and deflection, the rest of the connector can comprise at least one recess that allows a deflection of the arm. The recess can take up the deflected part of the arm.

The arm can be spaced from the rest of the connector in a radial direction at the contact section.

The latching element can comprise a latching face facing counter to the connection direction to allow a safe latching. The latching face can be substantially perpendicular to the connection direction.

The latching element can comprise a step. The step can comprise an inner edge and an outer edge. The latching face can be part of the step and can in particular be located between the inner edge and the outer edge.

In order to allow a simple assembly, the securing element can be located at an end of the arm, in particular a free end.

To allow a safe sideways guiding, the arm can comprise at least one lateral guiding face for guiding the securing element in or counter to a lateral direction.

A normal of the lateral guiding face can be perpendicular to the connection direction and the deflection direction of the securing element. The lateral guiding face can guide the securing element towards the counter securing element.

In a preferred embodiment, the at least one guiding face is located at an end of the arm. This allows the guiding at an early stage of the connection process.

To allow a guiding in two opposing directions, the arm can comprise two lateral guiding faces on opposite sides. The two lateral guiding faces can be parallel but can face in opposite directions. In other embodiments, the two lateral guiding faces can form a tapering shape to allow a funneling guiding.

At least one counter lateral guiding face can be present on the mating connector. The counter lateral guiding face can be at least partially complementary to the guiding face.

The arm can comprises at least one stop face facing in the connection direction for limiting a movement of the mating connector towards the connector. The corresponding counter stop face can be located on the mating connector.

The actuation section can be adapted to be accessible from outside. A tool or a test finger can be defined in official or company standards relating to the accessibility.

An access space can be present in the mounted state. The access space can be an open access space, allowing access from several directions.

The access space can comprise a straight access channel running from the actuation section to an outside point. Such a straight access channel can be a cylindrical channel with a diameter of a test finger, thus simulating the accessibility by a finger.

Advantageously, the securing element is operable, in particular releasable, from outside.

To allow a good force flow, the connector can be adapted to be mounted onto a cable in a force-transmitting manner. The cable can in particular be an appropriate cable and/or a standardized cable.

Mounting of the cable can be done by clamping or a force fit. The connector can comprise an attachment section, at which the cable is to be attached. The attachment section can comprise a receptacle adapted to clamp the cable. An inner cross section of the receptacle is preferably slightly smaller than the outer dimensions of the cable to allow a good clamping. In other embodiments, only a part of the cable is mounted, for example only a shielding or an insulation part is clamped to the connector.

The mechanical connecting and the contacting of the connector and the mating connector can be decoupled with the inventive solution. In particular, respective means can be located on separate parts.

In a mounted state, a strain (or force) exerted by the cable counter to the connection direction can be guided from the cable through the arm to the mating connector.

Preferably, the contact section is not or only slightly subjected to the strain. Less than 10% of the force exerted by the cable can be present in the contact section, preferably less than 5%.

To allow an easy operation, the arm may comprise a first extension section extending from the base section, a second extension section extending from the first extension section and an end section extending from the second extension section.

For easy insertability and an easy mating, an outer surface of the base section can be parallel to the connection direction, an outer surface of the first extension section can be inclined at a first angle to the connection direction, an outer surface of the second extension section can be inclined at a second angle to the connection direction, the second angle being greater than the first angle, and an outer surface of the end section can be parallel to the connection direction. The surfaces can be plane. Preferably, the first angle is rather low, to allow a good accessibility, for example between 10 and 30 degrees. The second angle is preferably rather big, for example between 40 and 80, especially between 50 and 70 degrees. By this, a good latching height is achieved while keeping the total length of the arm at a reasonable value.

The first section can longer (measured along the connection direction) than the second section by a factor of at least 2. The first section can make up at least one third of the total length of the arm to allow a good operability.

According to an advantageous embodiment, the arm can be integral (or synonymously one-piece or monolithic) with further parts of the connector. For example, the arm can be integral with the base section, the contact section and/or a base body of the connector. In a preferred embodiment, the entire connector, possibly with the exception of the contact elements, is a single integral piece. Such a connector can be easy to manufacture, for example by injection moulding, for instance from a plastic material.

According to a different embodiment, the arm can be part of a separate element or be a separate part.

The arm can be part of a strain relief device for transmitting mechanical strain acting on the connector at least partially counter to the connection direction onto the mating connector, wherein the strain relief device is mountable and/or mounted to the rest of the connector.

Preferably, the arm or the strain relief device is made from a material that is different from the material from which the rest of the connector is made. For example, the rest of the connector can be made from a plastic while the part comprising the arm can be made from metal to achieve a high mechanical stability.

According to another embodiment, the rest of the connector and the part comprising the arm are each pieces made of plastic, the two different parts having different properties. For example, the rest of the connector can be made from a material that is easily mouldable, while the part comprising the arm can be made from a plastic comprising fibers, in particular glass fibers, to increase the mechanical stability.

The arm or the strain relief device may be repeatedly detachable from the rest of the connector. In other embodiments, the arm or the strain relief device can be mounted only once and cannot be unmounted without damaging or destroying the arm or the part of the connector to which it is mounted.

The mounting may be achieved by plugging, leading, for example to a press fit, a form fit, or a force fit. Further possible methods of mounting include gluing and/or ultrasonic welding.

The connector, in particular a base body of the connector, may comprise a mounting section for mounting the strain relief device or the arm. The mounting section can be located closer to the distal end of the connector than the contact section.

The strain relief device can comprise the base section. The arm can be integral with the base section to achieve an easy manufacturability.

In a preferred embodiment, the strain relief device comprises an open ring, wherein the arm protrudes from the open ring, and wherein the connector, in particular a base body, comprises an engagement section for the open ring, the engagement section comprising at least one engagement face facing towards the distal end of the connector.

The open ring can be adapted for mounting the strain relief device to the rest of the connector. The engagement section can be a mounting section.

The arm can protrude or extend in a direction transverse to a plane defined by the open ring. An extension direction of the arm, which can, for example, be defined as going from a central point at the tip to a central point at the part where the arm is attached to the base section, can be at an angle of greater than 70° to the plane defined by the open ring.

To allow a stable mounting, the engagement section can at least in sections be complementary to the open ring.

The open ring may comprise at least one mating engagement face adapted to engage the engagement face of the engagement section. The engagement face and the mating engagement face can be at least partially complementary. The mating engagement face can face in the connection direction in the mounted state.

The open ring and the arm can be rigidly connected to each other. Preferably, the two are integral.

The open ring, the base section and the arm may be the only parts of the strain relief device, with no further, intermediate parts being present.

The force acting on the cable can run from the cable via the attachment section, the engagement section, the strain relief device and the counter securing element to the mating connector.

To allow a simple mating process, an end section of the arm can run parallel to the connection direction. The end section can in particular be perpendicular to the plane defined by the open ring.

In a preferred embodiment, a cross section area of the arm decreases in the connection direction, the extension direction or in a direction pointing away from the open ring, respectively. Such a configuration provides stability at the part next to the base section while allowing an easy deflection at the free end.

To achieve lateral stability, a width of the arm, which can be measured in the tangential direction, can be constant along the connection direction up to the end section.

A thickness of the arm, which can be measured in the radial direction, can decrease along the connection direction or the extension direction, at least up to the securing element.

Preferably, a ratio of the width to the thickness of the arm is at least 1.2 along the cable direction. This ratio can increase along the cable direction or the extension direction, respectively, to preferably gradually go from a cross-section providing stability to a cross-section allowing flexibility.

The arm may have a rectangular cross-section to facilitate manufacturing. The cross-section can be cut perpendicular to the connection or extension direction, respectively. The rectangular cross-section can be maintained along the entire length measured along the connection or extension direction, respectively.

A ratio of the length of the arm to the maximum outer diameter of the open ring is preferably between 0.5 and 4. This can allow an easy operability of the securing element while providing sufficient stability due to a large enough diameter of the open ring. The length of the arm is here to be understood as the free length along which the arm extends away from the base section.

More preferably, the value is greater than 1, especially greater than 1.5, and/or less than 3, more preferably less than 2.

Apart from the contact elements, the connector can consist only of the strain relief device and a base body. The contact section can be a part of the base body.

The connector can comprise an insulation collar located between the engagement section and the distal end. This can allow an electrical insulation between parts located on different sides of the insulation collar.

The insulation collar can protrude outwards. It preferably runs along the entire circumference to achieve a good insulation. The insulation collar can form a wall of the engagement section. In a compact design, the insulation collar provides at least one counter engagement face for the strain relief device facing in the connection direction. The insulation collar can be integral with the rest of connector, in particular the base body. A plane defined by the insulation collar is an advantageous embodiment parallel to the plane defined by an open ring in the mounted state.

To allow a defined relative position, the strain relief device and/or the rest of the connector, in particular the base body, can comprise at least one keying element.

The keying element can be adapted for blocking a rotational movement of the strain relief device relative to the rest of the connector, where a rotation is to be understood as a rotation around the connection direction.

The keying element can comprise at least one protrusion, and/or at least one recess.

To allow an easy production, at least one device keying element (a keying element located on the strain relief device) is located at one end of the open ring. Preferably, two device keying elements are located at opposite ends of the open ring.

To allow a firmer grip, a section of the inner circumference of the strain relief device between the two device keying elements is equal or slightly less than a section of the circumference between two connector keying elements at the connector, in particular the base body. The circumference should be located at the engagement section. The sections can be defined as being limited by two rotational stop faces of the strain relief device or two mating rotational stop faces of the connector.

To allow a compact design, the at least one device keying element preferably protrudes radially inwards.

The open ring and/or the strain relief device can be mirror-symmetrical to achieve a good distribution.

Similarly, the arm can be attached to the open ring halfway between the two ends of the open ring.

A gap of the open ring may be radially opposite the arm.

To achieve a well-balanced force distribution, the open ring can be substantially circular. Circular here relates to the overall shape of the open ring.

In another development, the open ring can have a different overall shape, for example a rectangular, a polygonal or an oval overall shape The open ring can have a rectangular cross-section. The cross-section is here cut in a radial-axial plane. Such an embodiment can be easy to manufacture.

Long sides of the rectangle can face outwards and inwards, while short sides may face along and counter to the connection direction. This can provide stability against tilting while providing a good engagement along and counter to the connection direction.

Preferably, a ratio of the lengths of the long sides to the lengths of the short sides is less than 4, more preferably less than 2.

The engagement section preferably comprises a substantially circular groove. The engagement section can be formed as a channel or a trough. It can comprise sidewalls and a bottom wall leading to a basically open rectangular cross-section.

To optimize the free length of the arm, the engagement section can be located between the contact section and the distal end of the connector.

According to one embodiment, the engagement section extends, preferably tangentially, at an outer side of the connector, in particular the base body, if applicable. The engagement section can be open radially outwards to allow an easy mounting.

The engagement section can run almost 360°, for example more than 320° or more than 340° around the connection direction and/or along more than 80%, preferably more than 90%, of the circumference.

To allow a space-saving configuration, the securing element may be located within the inner space defined by the open ring when viewed along the connection direction.

Moreover, when viewed along the connection direction, the ratio of the distance between the outermost point of the securing element to the centroid of the open ring to the distance between the innermost point of the open ring and the centroid of the open ring is less than 0.8. This can improve the stability. The ratio is preferably less than 0.6, less than 0.5, less than 0.3 or less than 0.2.

The centroid is equal to the center of mass if the material is considered homogeneous. It can be seen as a geometrical center of mass.

In a preferred configuration improving stability, the open ring extends at least 300°, preferably at least 320°, more preferable at least 340° around the centroid.

In an embodiment, a connection assembly includes a connector and a mating connector.

In a preferred embodiment, in a pre-mounting state, in which the connector and the mating connector are spaced from each other along the connection direction, in particular vis-à-vis a mated state, a distance between the at least one lateral guiding face on the connector and the mating counter lateral guiding face on the mating connector is smaller than each distance between a contact element and its corresponding mating contact element. In each case, the foremost points of faces or elements can be taken for measuring the distances between them.

In a corresponding connection step, the lateral guiding face overlaps or contacts the counter lateral guiding face before any of the contact elements contacts the corresponding counter contact element. Thus, safety is increased.

In a further embodiment of the connection assembly, the connector is connected to the mating connector, wherein the actuation section is accessible from outside. This allows an operation of the securing element in the connected state.

The connector is in particular connected to the connector in a strain-relieving manner by the arm or the strain relief device, respectively.

An access space and in particular an access channel as defined above can be present.

In one embodiment, the mating connector is mounted to a support at a lower side of the connection assembly and the arm is located at an upper side of the connection assembly. This allows an accessibility of the arm. The upper side is opposite the lower side. Thus, the rest of the connection assembly is located between the arm and the support. The possible support can be a printed circuit board (PCB), in particular a flexible PCB.

In an embodiment, a connection group is provided including a connection assembly and a bulkhead, wherein the connection assembly is located in a receptacle of the bulkhead, wherein the actuation section is accessible through an opening of the receptacle. Again, access can be defined by an access space in particular an access channel as above.

In one embodiment, the receptacle is tubular. It can be open in and against the connection direction, and be closed in the radial directions.

The opening can be a front or an outside opening.

The connector can comprises at least one contact element receptacle for the at least one contact element. The contact element can be insertable into the contact element receptacle.

In other embodiments, the contact element can be overmolded and be fixed to the rest of the connector during a molding step.

The connector can be adapted to be connected to the mating connector by plugging. The connector can be a male connector while the mating connector can be a female connector, or vice versa.

The contact element can be adapted for plugging along a plugging direction. The plugging direction can be the connection direction. For example, the at least one contact element and the mating contact element can be elongated and extend along the plugging direction.

Preferably, the distal end is a cable side end, i.e. an end where the cable enters the rest of the connector, for example a base body of the connector.

The subject matter herein is described in greater detail and in an exemplary manner using advantageous embodiments and with reference to the drawings. The described embodiments are only possible configurations in which, however, the individual features as described above can be provided independently of one another or can be omitted.

DETAILED DESCRIPTION OF THE INVENTION

In the figures, exemplary embodiments of a connector 100, a mating connector 200, a connection assembly 300 and a connection group 500 are depicted.

Figure 4:
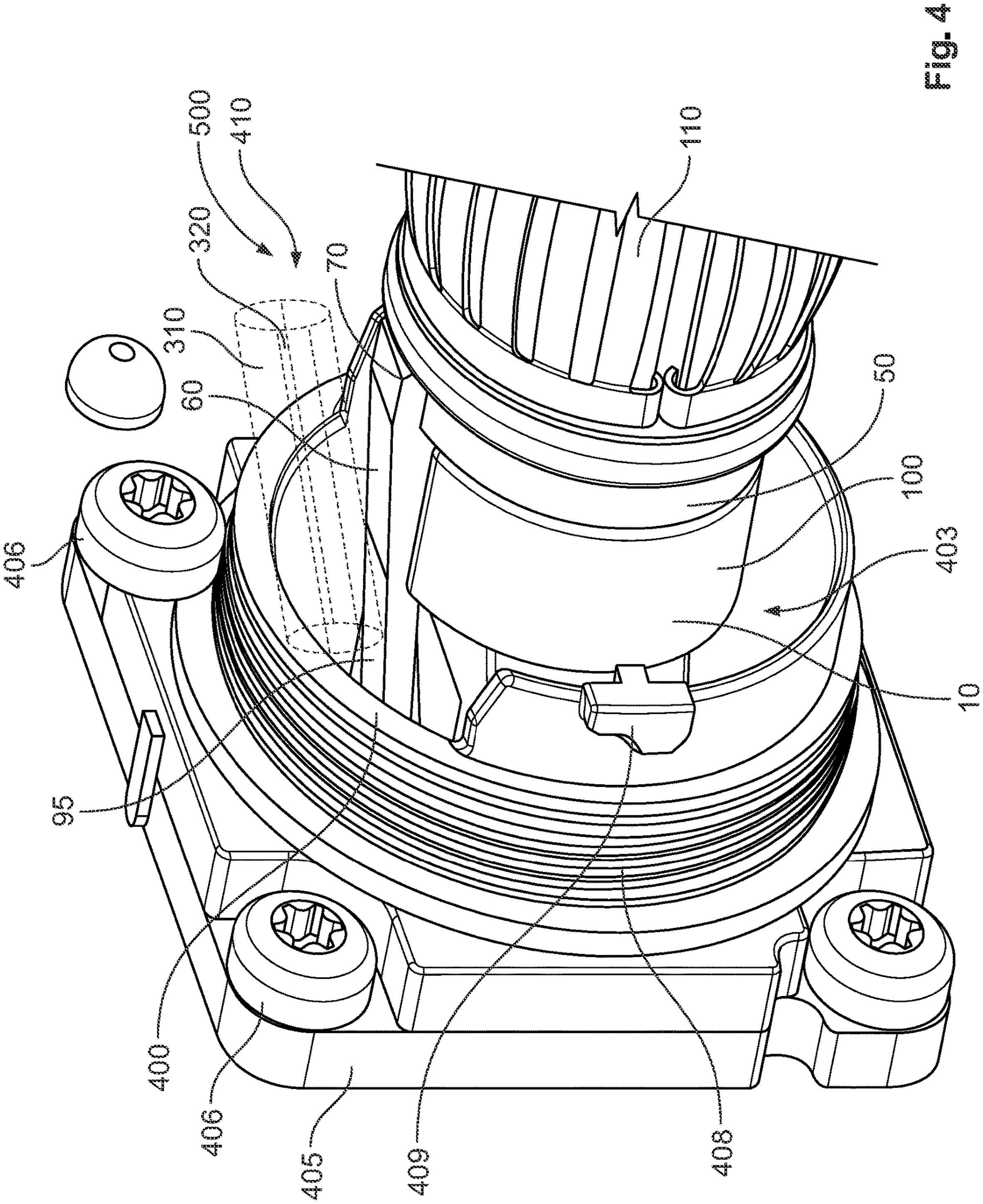
FIG. 4 is a schematic perspective view of a connection group in accordance with embodiments herein.
Figure 5:
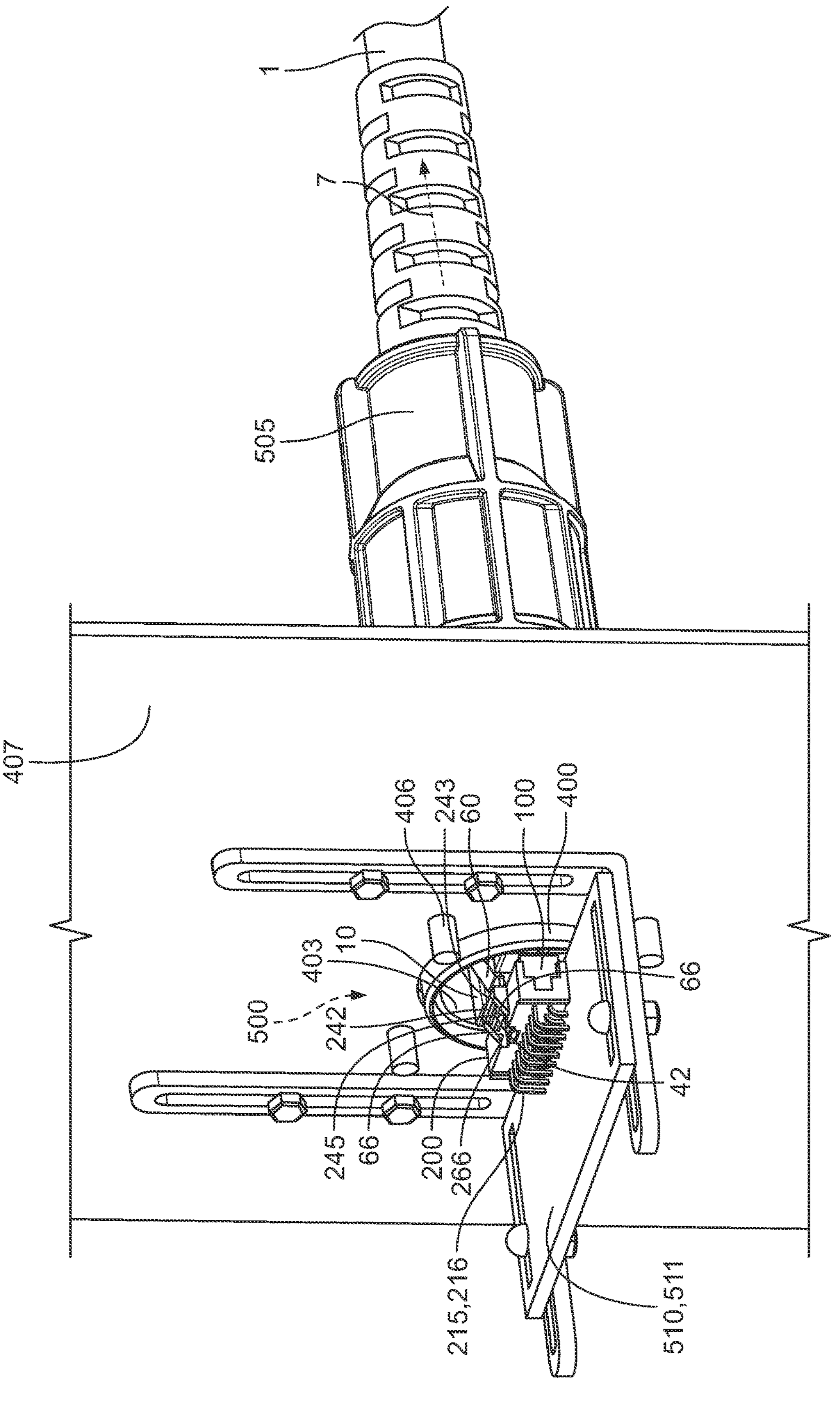
FIG. 5 is a further schematic perspective view of a connection group in accordance with embodiments herein.
Figure 6:
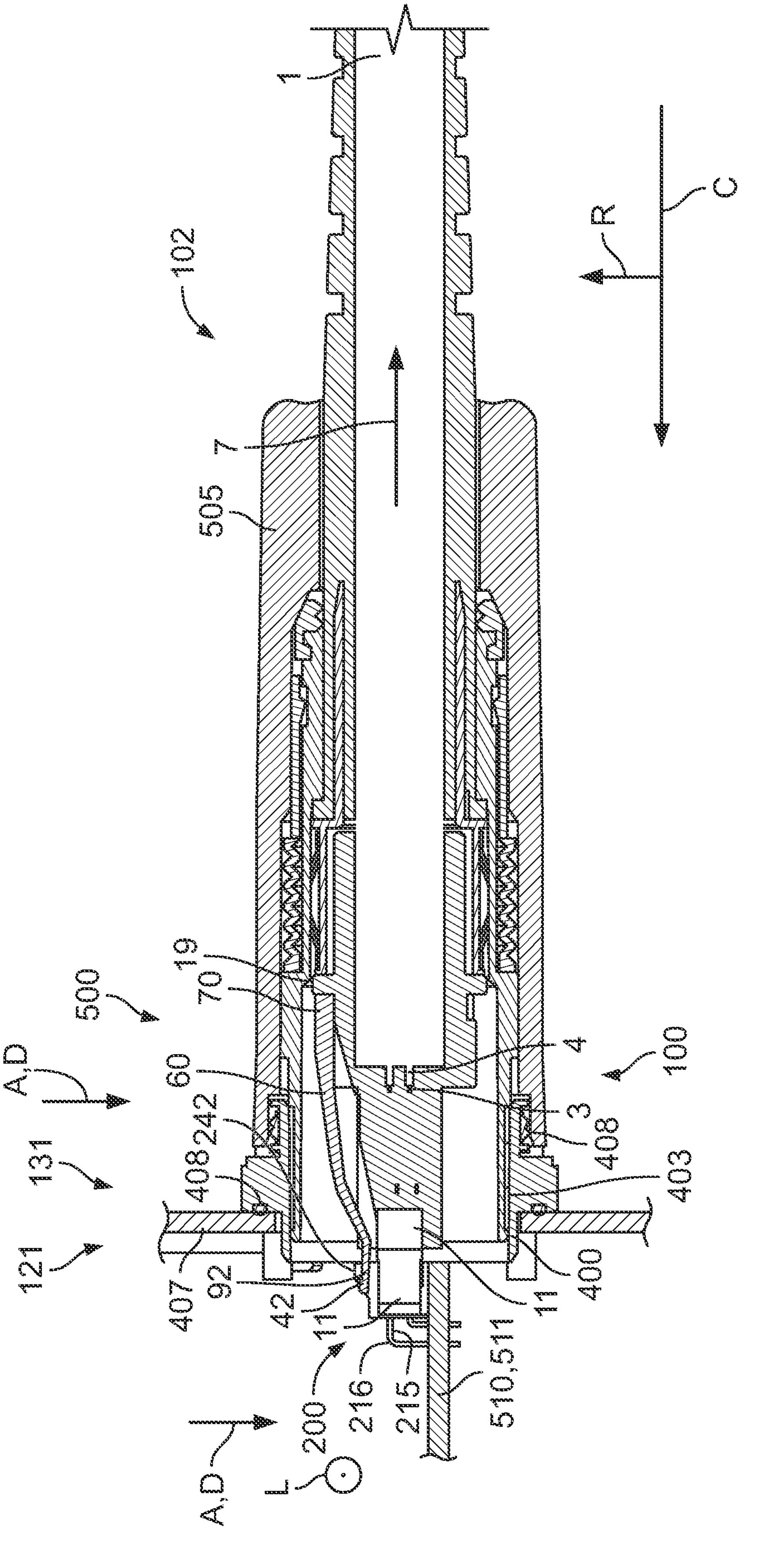
FIG. 6 is a schematic cross-sectional view of the connection group of FIG. 5 in accordance with embodiments herein.

The connector 100 is adapted to be connected to the mating connector 200 along a connection direction C. As can be seen in FIGS. 4, 5 and 6, the mating connector is accessible through a receptacle 403 of a bulkhead 400. The bulkhead 400 is mounted to a housing 407, for example of an electrical device. The mounting plate 405 of the bulkhead 400 is mounted with screws 406 to the housing 407.

The connector 100 is a plug that can be connected to the mating connector 200 by plugging at a proximal end 101. The plugging direction P is parallel to the connection direction C. The contact elements 15 of the connector 100 are embodied as sockets 14 that are elongated along the connection direction C and are used for contacting mating contact elements 215 on the mating connector 200. The mating contact elements 215 comprise pins 216 adapted for being inserted into the contact elements 15. The pins 216 extend from the back of the mating connector 200 down to a support 510 in the form of a PCB 511.

Figure 2:
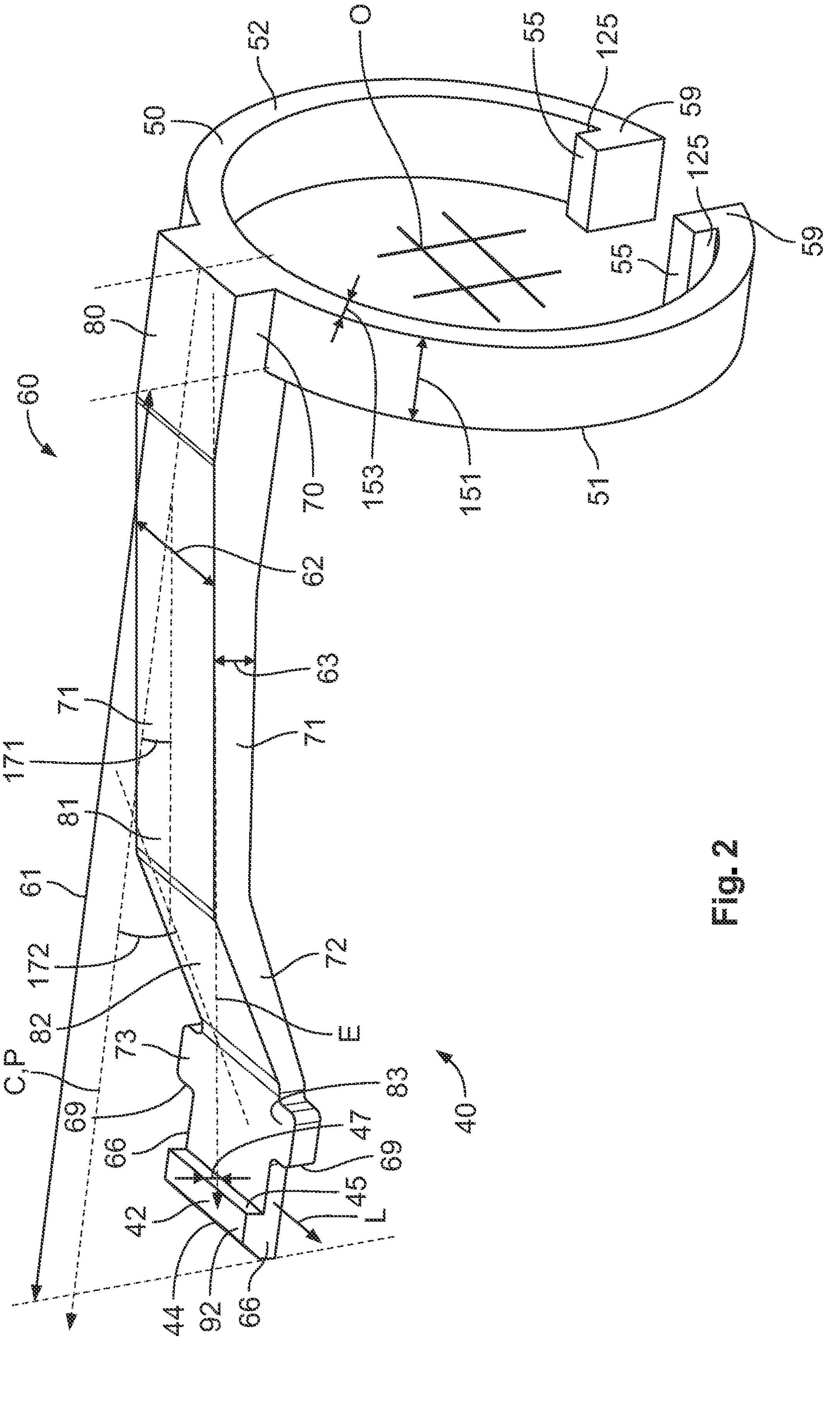
FIG. 2 is a schematic perspective view of a strain relief device in accordance with embodiments herein.
Figure 3:
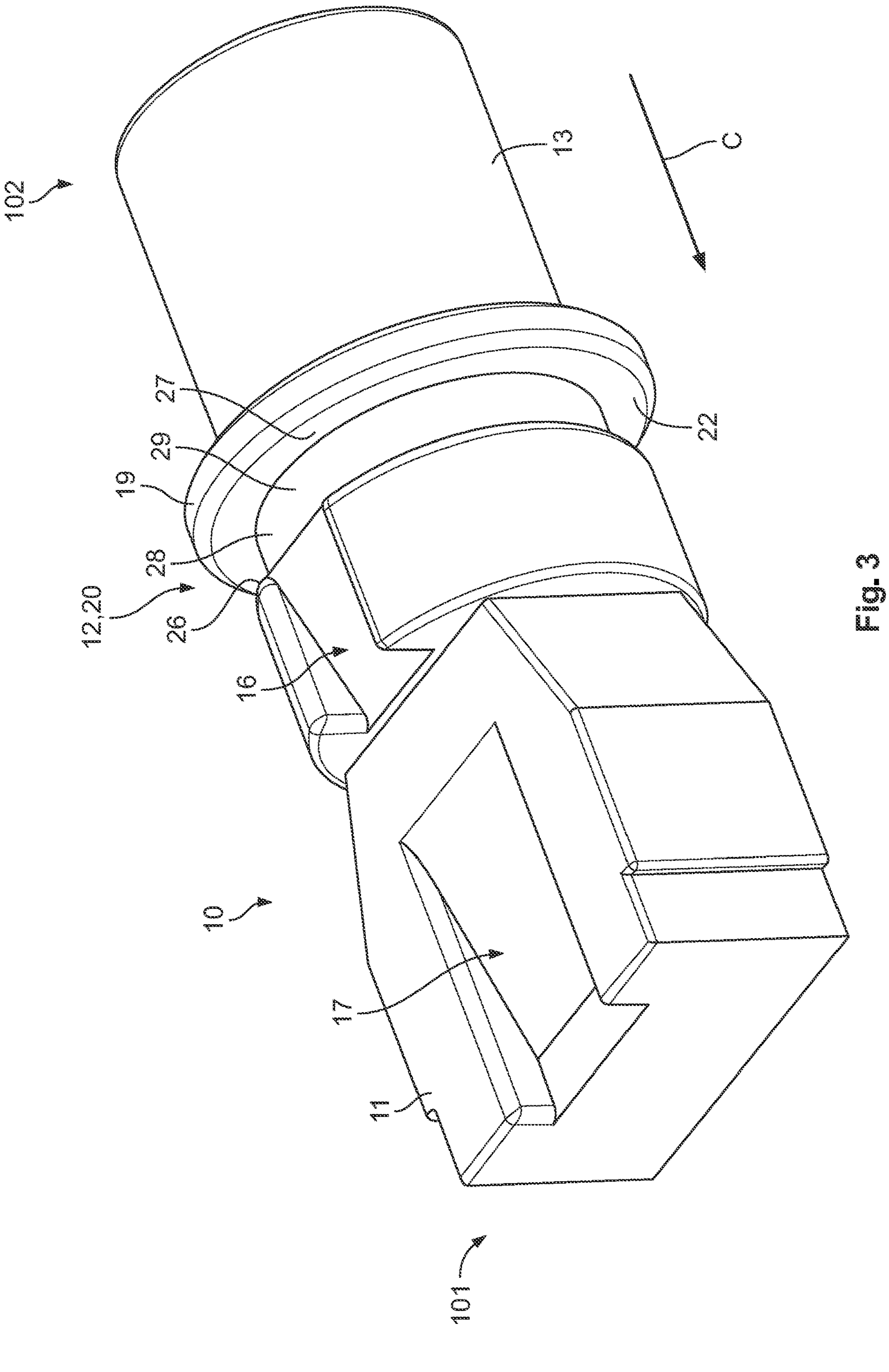
FIG. 3 is a schematic perspective view of a base body in accordance with embodiments herein.

The connector 100 comprises an arm 60 that extends away from a base section 70 of the connector 100. The arm 60 extends basically along an extension direction E, see for example FIG. 2, that runs substantially in the same direction as the connection direction C. Between the extension direction E and the connection direction C of the exemplary embodiment, an angle of approximately 10 to 20° is present. The extension direction E can be defined as running from a central point of the arm next to the base section 70 to a central point of a front end of the arm 60.

At an end section 73 of the arm 60, a securing element 41 is located that serves for securing the connector 100 to the mating connector 200. The securing element 41 is a latching element 42 that automatically latches with a counter latching element 242 on the mating connector 200, when the connector 100 is mated with the mating connector 200.

The latching element 42 comprises a latching protrusion 43 that protrudes in a radial direction R. The radial direction R is perpendicular to the connection direction C. To achieve an automatic deflection of the arm 60, the latching element 42 comprises at the front a deflection face 44 that is inclined to the connection direction C.

Figure 7:
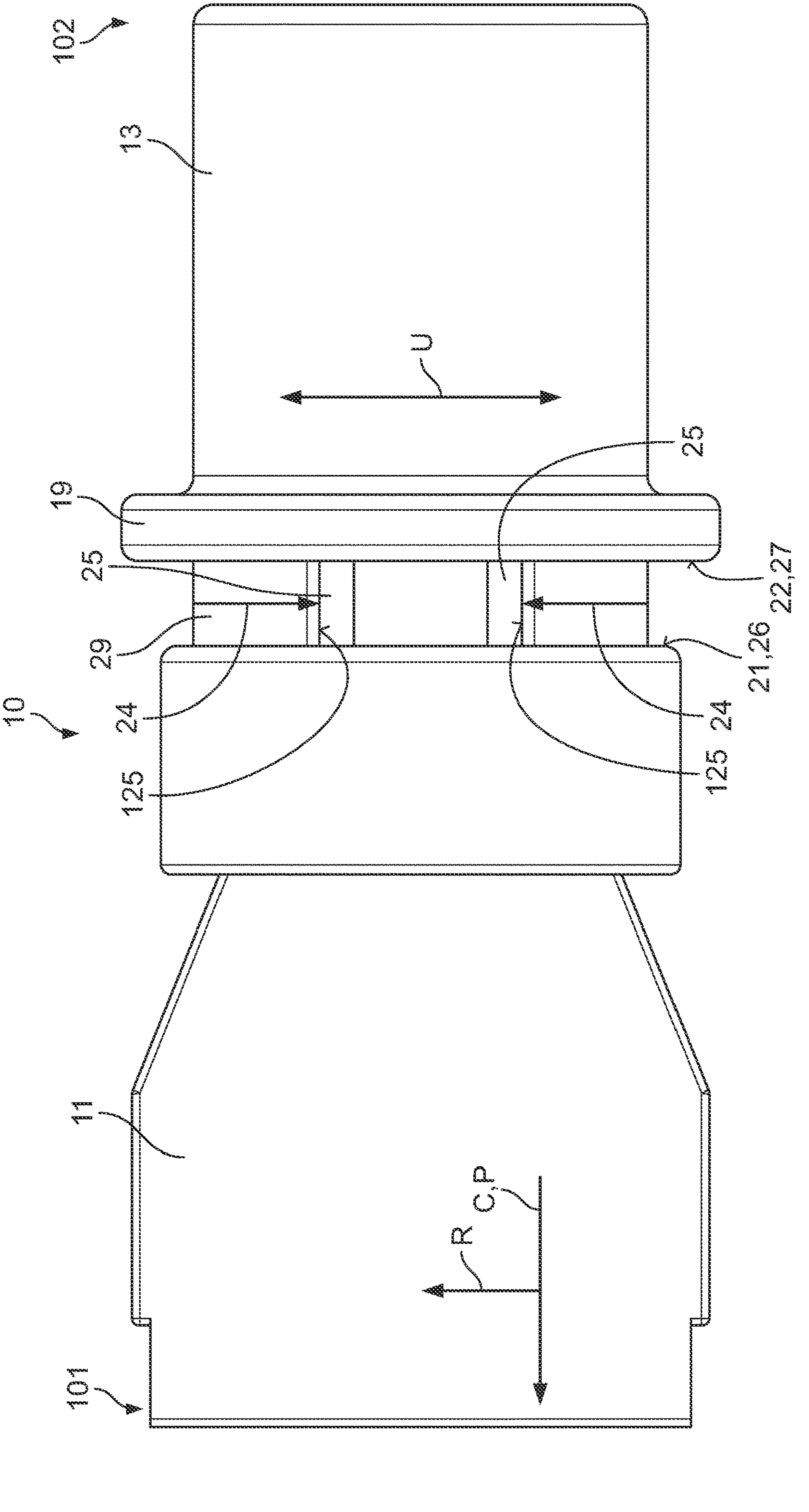
FIG. 7 is a further schematic perspective view of the base body of FIG. 3 in accordance with embodiments herein.

In a mated state, for example as shown in FIGS. 6 and 7, a latching face 45 of the latching element 42 is in contact with a counter latching face 245 of the mating connector 200. The latching face 45 is part of a step and faces counter to the connection direction C. A strain or force 7 acting on a cable 1 attached to the connector 100 against the connection direction C is thus transferred via the arm 60 to the mating connector 200. Only little force is present between the contact elements 15 and the mating contact elements 215. The securing element 41 thus secures the connector 100 at the mating connector 200.

The base section 70 is located closer to a distal end 102 of the connector 100 than the contact section 11 in which the contact elements 15 are located. Hence, the arm 60 is more easily accessible for an operator through the front side of the receptacle 403. The operator can release the latching connection by pushing or a pressing on an actuation section 95 of the arm 60 in an actuation direction A. The pushing or pressing can, for example, be done by a finger or by a tool. The arm 60 is then brought from a securing state 121, in which the securing element 41 is in a securing position 131, into a release state, in which the securing element 41 is in a release position. The securing element 41 is deflected along a deflection direction D that is parallel to the actuation direction A by the pushing and the latching is brought out of engagement. The connector 100 can then be separated from the mating connector 200.

In the embodiment shown in the figures, the arm 60 is part of a strain relief device 40 that can be mounted to a base body 10 of the connector 100 at a mounting section 12. The mounting section 12 is located between the contact section 11 and the distal end 102.

In the present example, the mounting section 12 is embodied as an engagement section 20. It comprises a groove or channel 29 running in a circular manner along a circumferential direction U of the base body 10. The channel 29 comprises a first sidewall 26 facing against the connection direction C, a second side wall 27 opposite the first sidewall 26 and facing in the connection direction C. A bottom wall 28 runs between the first sidewall 26 and the second sidewall 27. The channel 29 is open radially outwards. It serves for receiving and engaging an open ring 50 of the strain relief device 40.

The arm 60 is attached to the open ring 50 via the base section 70. All three parts are integral. The strain relief device 40 is a single element made from one type of material, which is preferably different from the material from which the base body 10 is made. For example, the strain relief device 40 can be made from a plastic that comprises fibers to achieve a good mechanical stability. The base body 10 can be made from a plastic that can be moulded easily.

In the mounted state, the open ring 50 lies in the channel 29. By this, a form fit or a positive fit between the strain relief device 40 and the base body 10 is achieved along and counter to the connection direction C. An engagement face 21, which is formed by the first sidewall 26, faces counter to the connection direction C and thus blocks a movement of the open ring 50 relative to the base body 10 along the connection direction C. The engagement face 21 lies against a mating engagement face 51 of the open ring 50, at least when the force 7 tries to pull the connector 100 away from the mating connector 200.

Similarly, a counter engagement face 22 formed by the second side wall 27 blocks a movement of the open ring 50 relative to the base body 10 against the connection direction C, by being in the way of a mating counter engagement face 52 on the open ring 50.

Thus, at the base section 70, apart from tolerances, no or little movement of the arm 60 relative to the base body 10 along and against the connection direction C is possible. Further, the base section 70 cannot move radially inwards or outwards due to the engagement of the open ring 50 and the engagement section 20.

Figure 8:
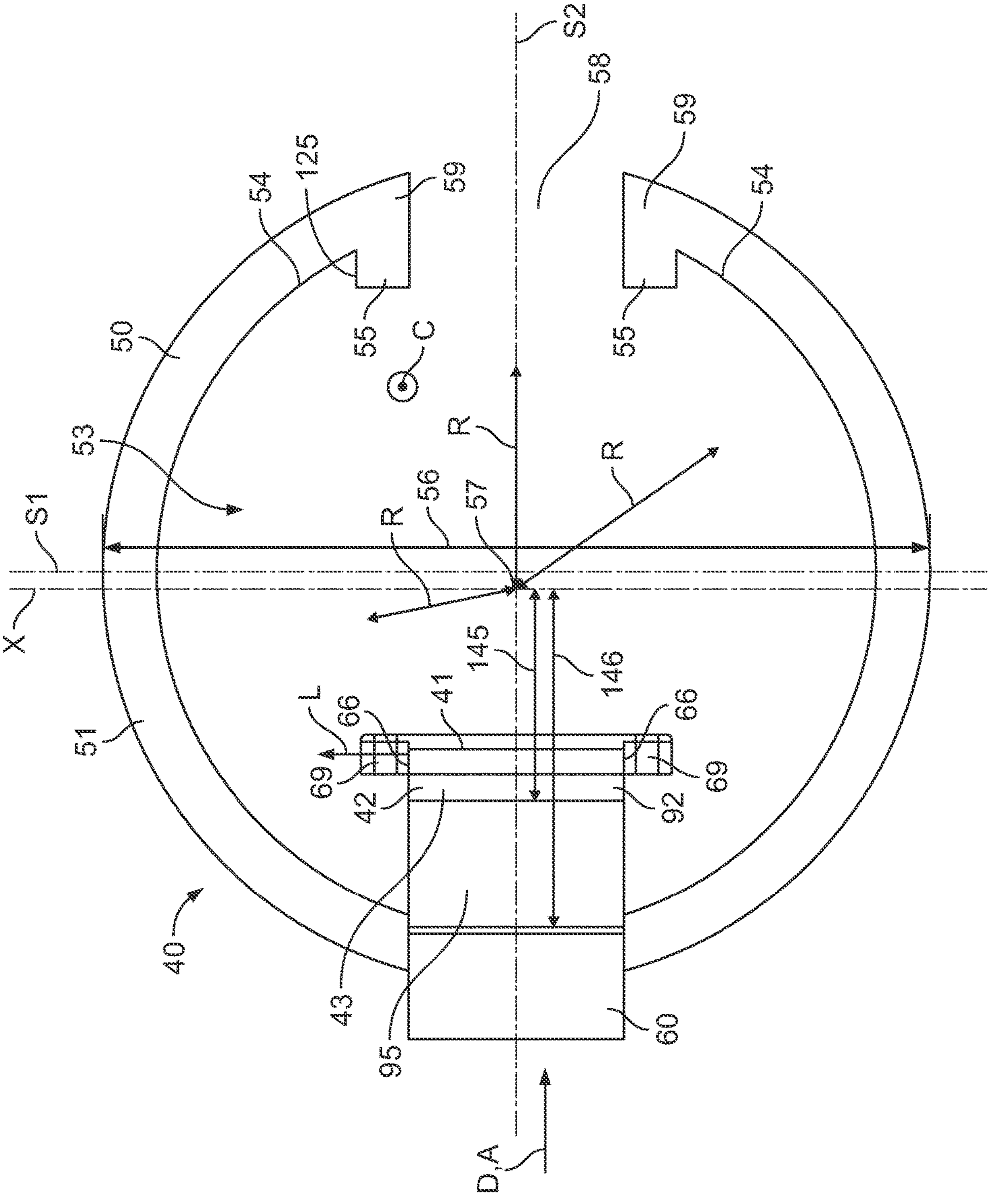
FIG. 8 is a further schematic perspective view of the strain relief device of FIG. 2.

Moreover, a rotation of the base section 70 along a tangential direction T, that is perpendicular to the radial direction R and the connection direction C, is blocked by the engagement of device keying elements 55 and connector keying elements 25. As can best be seen in FIGS. 2, 7 and 8, the device keying elements 55 are formed as protrusions that protrude radially inwards from ends 59 of the open ring 50 and interlock with connector keying elements 25 that are formed as holes or recesses that are open radially outwards.

To achieve a tight fit, a section 54 of the inner circumference of the open ring 50 between the two device keying elements 55 is equal or slightly less than a section 24 of the circumference between the two connector keying elements 25. The section can in particular be limited by stop faces 125 of the device keying elements 55 and the connector keying elements 25.

The open ring 50 and the arm 60 and thus the entire strain relief device 40 is mirror-symmetrical about the symmetry plane S2. This leads to a good distribution of the force.

The base section 70 and the arm 60 are located radially opposite an open gap 58 between the ends 59 of the open ring 50 to enable a simple mounting. The arm 60 is halfway between the two ends 59.

The open ring 50 is basically circular.

In a plane comprising a radial direction R and the connection direction C, its cross-section is rectangular and matches basically the open rectangular cross-section of the channel 29. Long sides of the rectangle face radially inwards and outwards, short sides of the rectangle face in and counter to the connection direction C. A width 151 of the open ring 50 measured along the connection direction C is approximately twice a thickness 153 measured along the radial direction R to achieve a good mechanical stability.

A plane O defined by the open ring 50 is perpendicular to the connection direction C.

A centroid 57 of the open ring 50 lies in a symmetry plane S2 and a parallel plane X that is parallel to a plane S1 through the center of the open ring 50. The centroid 57 is to be understood as the geometric center of gravity and identical to the center of gravity if the density of the open ring 50 is homogeneous. In the depicted case, the centroid 57 is shifted slightly towards the base section 70 due to the open gap 58.

To keep the forces on the open ring 50 low when the latching element 42 is deflected along the deflection direction D, the securing element 1 is located within the inner space 53 defined by the open ring 50, when viewed along the connection direction C.

In particular, when viewed along the connection direction C, the ratio of the radial distance 145 between the outermost point of the securing element 41 to the centroid 57 of the open ring 50 to the radial distance 146 between the innermost point of the open ring 50 and the centroid 57 of the open ring 50 is less than 0.8.

The connector 100 is adapted for an inwards deflection of a latching section 92 of the arm 60. The actuation section 95 is spaced radially along its entire length from the base body 10. To allow an inwards deflection of the actuation section 95 and the latching section 92 at which the latching element 42 is located, the base body 10 comprises a first recess 16 and a second recess 17, the second recess 17 being located at the contact section 11. The first recess 16 and the second recess 17 comprise faces inclined relative to the connection direction C. This improves the mechanical stability of the base body 10. The latching section 92 is deflectable radially.

The arm 60 is radially spaced from the rest of the connector 100 at a distance allowing a deflection length of the latching element 42 between 1 and 5 times a latching height 47. The latching height 47 is here equal to the height of the latching face 45 along the deflection direction D. This can be achieved when the latching section 92 is spaced between 1 and 5 times the latching height 47 from the rest of the connector 100.

The actuation section 95 extends over more than 60% of the length of the contact section 11. In the depicted embodiment, it extends over almost the entire length of the contact section 11. Due to the lever effect, the actuation section 95, which is located between the latching section 95 and the base section, does not have to be defected as much as the latching section 95. An actuation of only a fraction of the latching height 47 is necessary to release the latching connection.

The latching section 95 is an end section 73 located at a free end of the arm 60.

The open ring 50 extends almost along the entire circumference of the base body 10, when mounted, for example more than 300° around the connection direction C. In an unmounted state, the open ring 50 extends more than 300° around the centroid 57.

The connector 100 can be mounted to the cable 1 in a force-transmitting manner, for example at an attachment section 13. The force 7 can then mainly go from the cable 1 to the engagement section 20, the open ring 50, the arm 60, and the securing element 41 to the mating securing element 241 of the mating connector 200. The mechanical connecting is thus decoupled from the electrical contacting.

The arm 60 comprises a first extension section 71 extending from the base section 70, a second extension section 72 extending from the first extension section 71 and the end section 73 extending from the second extension section 72.

An outer face 80 of the base section 70 is basically parallel to the connection direction. An outer face 81 of the first extension section 71 is inclined at a first angle 171 to the connection direction. An outer face 82 of the second extension section 72is inclined at the second angle 172 to the connection direction C, the second angle 172 being greater than the first angle 171. On the one hand, this allows an easy insertion of the connector 100 into the receptacle 403, and on the other hand keeps the volume of material that has to be removed for the second recess 17 low, so that the base body 10 is mechanically stable. The faces 80, 81, 82, 83 are shown to be planar.

A width 62 of the arm 60 remains basically constant along the connection direction C or the extension direction E up to the end section 73. The width 62 is measured perpendicular to the extension direction E and the radial direction R.

A thickness 63 of the arm 60 measured along the radial direction R decreases along the extension direction E or the connection direction C.

In combination, a cross-section area of the arm 60 decreases along the extension direction E or the connection direction C. Thus, the end section 73 can be deflected easily, while the arm 60 is stable next to the base section 70. To minimize the twisting of the arm 60, a ratio of the width 62 to the thickness 63 increases along the extension direction E or the connection direction C. the arm 60 has a basically rectangular cross-section.

The ratio of the free length 61 of the arm measured along the connection direction C to the maximum outer diameter 56 of the open ring 50 is approximately 2. This is a good compromise between stability and accessibility of the actuation section 95.

To allow an easy connecting, the end section 73 is substantially parallel to the connection direction C.

For guiding the arm 60 perpendicular to the connection direction C and perpendicular to the deflection direction D, in particular the latching element 42 relative to the mating latching element 242, the arm 60 comprises two lateral guiding faces 66. Parts of the lateral guiding faces 66 are parts of the latching element 42. The two lateral guiding faces 66 are located on opposite sides of the arm 60 at an end of the arm 60 and face in opposite directions, namely in and counter to a lateral direction L perpendicular to the connection direction C and the deflecting direction D. The lateral guiding faces 66 are adapted to engage counter lateral guiding faces 266 of the mating connector 200 during the mating process. In particular, the connector 100 and the mating connector 200 are configured such that the lateral guiding faces 66 contact (or at least overlap if alignment is perfect) the counter lateral guiding faces 266 before the contact elements 15 contact the mating contact elements 215.

In a non-depicted pre-mounting state, in which the connector 100 and the mating connector 200 are spaced from each other along the connection direction C, a distance between the at least one lateral guiding face 66 and the mating counter lateral guiding face 266 is smaller than each distance between a contact element 15 and the corresponding mating contact element 215.

For limiting the movement of the mating connector 200 towards the connector 100, stop faces 69 facing in the connection direction C are located on the arm 60. Corresponding counter stop faces 269 are located on the mating connector 200.

When the connector 100 is mated with the mating connector 200, the actuation section 95 is accessible from outside. An access space 310 is present. The access space 310 can, for example, be an open access space 310 that is open in several directions, see FIG. 1. The access space 310 in particular comprises an access channel 320 (see FIG. 4) that can, for example, be cylindrical. The access channel 320 can represent the accessibility by a finger, for example a test finger, or a defined tool. Such an accessibility can be defined by official or company standards. The depicted straight access channel 320 extends from the actuation section 95 to a point at an outside.

The connector 100 comprises an insulation collar 19 that is located between the engagement section 20 and the distal end 102. The insulation collar 19 protrudes radially outwards, runs along the entire circumference and forms the second sidewall 27 of the engagement section 20. The plane defined by the insulation collar 19 is parallel to the plane O defined by the open ring 50 in the mounted state.

As can be seen in FIGS. 5 and 6, the mating connector 200 is mounted to the support 510 at a lower side of the connection assembly 300 and the arm 60 is located at an upper side of the connection assembly 200, opposite the lower side.

The counter securing element 241 comprises counter latching elements 242. The counter latching elements are part of a ring 243 that has a counter latching face 245 on its backside. The counter securing element 242 and the ring 243 do not protrude against the connection direction C from the rest of the mating connector 200. A front face of the ring 243 is plane with a foremost part of the rest of the mating connector 200.

FIGS. 5 and 6 show an additional housing 505 that can be mounted to the connector for protection purposes by a bayonet mechanism 409. Seals 408 serve for sealing the connection to the housing 505.

As can be seen in FIG. 6, the exemplary cable 1 comprises lines 4 with an inner conductors 3 that are electrically connected to the contact elements 15.

Figure 1:
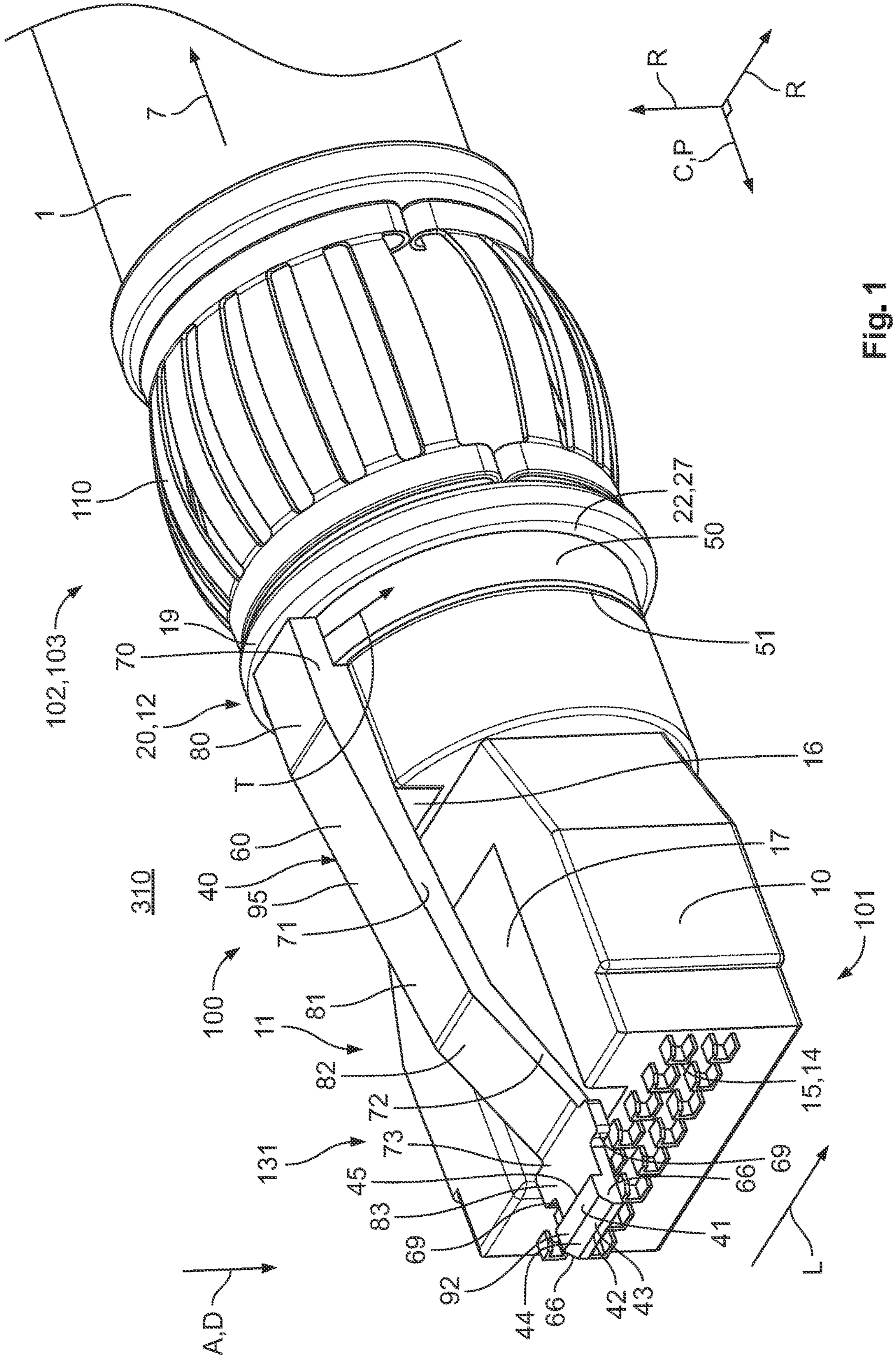
FIG. 1 is a schematic perspective view of a connector attached to a cable in accordance with embodiments herein.

In FIGS. 1, 4 and 6, a cage 110 that is used for connecting an outer shielding layer of the cable 1 to a further part can be seen.

The extension of the contact section 12 along the connection direction C can be defined as the extension of the longest contact element 15 along the connection direction C.

The expression "closer than" can be understood such that a furthest or most remote part of one element is closer to the distal end 102 than a closest part of a second element. In the present case, a furthest part of the base section can be closer to the distal end 102 than a closest part of any of the contact elements 15.

The strain relief device 40 is repeatedly detachable from the rest of the connector 100, in particular the base body 10. In other embodiments, the strain relief device 40 could be such that it is attachable only once. For example, ends of a ring could be welded to each other.

In the depicted example, the arm 60 is mounted to the base body 10 by the open ring 50. In other embodiments, the arm could be attached by a different mechanism, for example by a pin and socket mechanism, by gluing, ultrasonic welding or a pressin connection.

Further, the arm 60 is shown as being separate from the rest of the connector 100. In another embodiment, the arm could be integral with the rest of the connector 100, in particular with the base body 10.

In one embodiment, the distal end 102 is a cable side end 103, at which the cable 1 enters the connector 100. In other embodiments, the cable side end 102 can be different from the distal end 12.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. Connector for connecting at a proximal end of the connector along a connection direction with a mating connector arranged behind a bulkhead and accessible through a receptacle of the bulkhead, the connector comprising:

a contact section adapted to fix at least one contact element, the contact section configured to pass through the receptacle in the bulkhead for mating with the mating connector, a base section, and an arm extending from the base section substantially along the connection direction, wherein the arm comprises at least one securing element configured to be mated directly to the mating connector when passed through the receptacle in the bulkhead for securing the connector to the mating connector and preventing movement along the connection direction away from the mating connector, wherein the base section is located closer to a distal end of the connector than the contact section, the distal end being opposite to the proximal end along the connection direction.

2. Connector according to claim 1, wherein the arm comprises an actuation section, wherein the securing element is transferable from a securing state to a release state by an actuation at the actuation section.

3. Connector according to claim 2, wherein the actuation section is adapted to be accessible from an outside of the connector.

4. Connector according to claim 1, wherein the arm comprises at least one lateral guiding face for guiding the securing element in a lateral direction transverse to the connection direction.

5. Connector according to claim 1, wherein the arm comprises a first extension section extending from the base section, a second extension section extending from the first extension section and an end section extending from the second extension section.

6. Connector according to claim 1, wherein the securing element comprises a latching element.

7. Connector according to claim 6, wherein the latching element comprises a latching protrusion protruding radially outwards.

8. Connector according to claim 6, wherein a latching section of the arm comprising the latching element is deflectable radially inwards.

9. Connector according claim 1, wherein the arm is part of a strain relief device for transmitting mechanical strain acting on the connector at least partially counter to the connection direction onto a mating connector, wherein the strain relief device is mountable to an engagement section of the connector.

10. Connector according to claim 9, wherein the strain relief device comprises an open ring, wherein the arm protrudes from the open ring, the engagement section comprising at least one engagement face facing towards the distal end of the connector receiving the open ring.

11. Connector according to claim 10, wherein, when viewed along the connection direction, a ratio of a distance between an outermost point of the securing element to a centroid of the open ring to a distance between an innermost point of the open ring and the centroid of the open ring is less than 0.8.

12. Connection assembly comprising:

a connector for connecting at a proximal end of the connector along a connection direction, the connector including a contact element at a contact section, a base section, and an arm extending from the base section substantially along the connection direction to the proximal end, the arm includes at least one securing element for securing the connector from movement along the connection direction, the arm includes a lateral guiding face for guiding the securing element in a lateral direction transverse to the connection direction, wherein the base section is located closer to a distal end of the connector than the contact section, the distal end being opposite to the proximal end along the connection direction; and a mating connector arranged behind a bulkhead and accessible through a receptacle of the bulkhead, the mating connector mated to the proximal end of the connector when the proximal end of the connector passes through the receptacle in the bulkhead, the mating connector including a mating contact element configured to be mated to the contact element of the connector, the mating connector including a mating counter lateral guiding face configured to interface with the lateral guiding face;

wherein in a pre-mounting state, in which the connector and the mating connector are spaced from each other along the connection direction, a distance between the at least one lateral guiding face and the mating counter lateral guiding face is smaller than a distance between the contact element and the corresponding mating contact element.

13. Connection assembly of claim 12, wherein the arm includes an actuation section, the securing element being transferable from a securing state to a release state by an actuation at the actuation section, the actuation section is accessible from an outside of the connector.

14. Connection assembly of claim 12, wherein the arm comprises a first extension section extending from the base section, a second extension section extending from the first extension section and an end section extending from the second extension section.

15. Connection assembly of claim 12, wherein the securing element comprises a latching element that is deflectable radially inward.

16. Connection assembly of claim 12, wherein the arm is part of a strain relief device for transmitting mechanical strain acting on the connector at least partially counter to the connection direction onto the mating connector, wherein the strain relief device is mountable to the rest of the connector.

17. Connection assembly of claim 16, wherein the strain relief device comprises an open ring, wherein the arm protrudes from the open ring, and wherein the connector comprises an engagement section for the open ring, the engagement section comprising at least one engagement face facing towards the distal end of the connector.

18. Connection group comprising:

a connection assembly including a connector and a mating connector, a proximal end of the connector being mated with the mating connector along a connection direction the mating connector including a mating contact element, the connector including a contact element at a contact section configured to be mated with the mating contact element, a base section, and an arm extending from the base section substantially along the connection direction to the proximal end, the arm includes at least one securing element configured to be mated directly to the mating connector for securing the connector to the mating connector and preventing movement along the connection direction away from the mating connector, the arm includes an actuation section, the securing element being transferable from a securing state to a release state by an actuation at the actuation section, the actuation section being accessible from an outside of the connector, wherein the base section is located closer to a distal end of the connector than the contact section, the distal end being opposite to the proximal end along the connection direction; and a bulkhead including a receptacle, the connection assembly being located in the receptacle of the bulkhead with the mating connector arranged behind the bulkhead and accessible through the receptacle of the bulkhead, wherein the at least one securing element of the arm is mated with the mating connector when passed through the receptacle in the bulkhead, the actuation section being accessible through an opening of the receptacle.

19. The connection group of claim 18, wherein the arm includes a lateral guiding face for guiding the securing element in a lateral direction transverse to the connection direction, the mating connector including a mating counter lateral guiding face configured to interface with the lateral guiding face, wherein in a pre-mounting state, in which the connector and the mating connector are spaced from each other along the connection direction, a distance between the at least one lateral guiding face and the mating counter lateral guiding face is smaller than a distance between the contact element and the corresponding mating contact element.

* * * * *